(12) United States Patent
Saito et al.

(10) Patent No.: US 7,354,047 B2
(45) Date of Patent: Apr. 8, 2008

(54) GASKET MATERIAL

(75) Inventors: Hiroshi Saito, Ikoma-gun (JP); Kenichiro Ishikawa, Ikoma-gun (JP)

(73) Assignee: Nichias Corporation, Tokyo (JP)

( * ) Notice: Subject to any disclaimer, the term of this patent is extended or adjusted under 35 U.S.C. 154(b) by 31 days.

(21) Appl. No.: 10/659,272

(22) Filed: Sep. 11, 2003

(65) Prior Publication Data

US 2004/0195781 A1 Oct. 7, 2004

(30) Foreign Application Priority Data

Sep. 13, 2002 (JP) ............ P. 2002-268437

(51) Int. Cl.
*F02F 11/00* (2006.01)

(52) U.S. Cl. .................. 277/592; 277/652

(58) Field of Classification Search .......... 277/628, 277/592, 650, 652
See application file for complete search history.

(56) References Cited

U.S. PATENT DOCUMENTS

| | | | | |
|---|---|---|---|---|
| 4,097,287 A | * | 6/1978 | Ito et al. ............ | 106/14.14 |
| 5,743,971 A | * | 4/1998 | Inoue et al. ............ | 148/247 |
| 6,000,339 A | * | 12/1999 | Matsuzawa ............ | 106/287.14 |
| 6,502,830 B2 | * | 1/2003 | Teranishi et al. ............ | 277/594 |
| 6,562,474 B1 | * | 5/2003 | Yoshimi et al. ............ | 428/472.3 |
| 6,623,863 B2 | * | 9/2003 | Kamitani et al. ............ | 428/429 |
| 2003/0022005 A1 | * | 1/2003 | Miyashita et al. ............ | 428/465 |
| 2003/0040553 A1 | * | 2/2003 | Mahmud et al. ............ | 523/215 |
| 2003/0072962 A1 | * | 4/2003 | Matsuzaki et al. ............ | 428/623 |
| 2005/0154112 A1 | * | 7/2005 | Shigeru et al. ............ | 524/430 |

FOREIGN PATENT DOCUMENTS

JP 3-227622 10/1991

* cited by examiner

*Primary Examiner*—Alison K Pickard
(74) *Attorney, Agent, or Firm*—Nixon & Vanderhye P.C.

(57) ABSTRACT

A gasket material to be mounted on an engine of a vehicle, including: a metal plate; a film made from silica and a reaction product of an acid component and metal or a metallic compound; and a rubber layer formed on at least one of opposite surfaces of the metal plate through the film.

9 Claims, No Drawings

GASKET MATERIAL

BACKGROUND OF THE INVENTION

The present invention relates to a gasket material to be mounted on an engine of a vehicle, and particularly relates to a gasket material improved in durability against antifreeze liquid.

A rubber-coated stainless steel plate in which a rubber layer is laminated to a stainless steel plate is generally used for a gasket, particularly a head gasket to be mounted on an engine of a vehicle. In addition, as disclosed on Japanese Application Publication Number 03-227622 (JP3-227622A), a gasket material in which a chromate film made from a chromium compound, phosphoric acid and silica is formed on one or each of opposite surfaces of a stainless steel plate in order to retain a rubber layer more firmly, and the rubber layer is laminated onto the chromate film, is also used.

Considerable two main damages of a gasket material caused during an operation of an engine are followings:
1. A destruction of adhesion between the rubber layer and the metal plate caused by an infiltration of coolant water and/or lubrication oil.
2. A destruction of adhesion between the rubber layer and the metal plate caused by heat from combustion of the engine.

In order to prevent these destructions, it is general to subject a chromate film between the rubber layer and the metal plate. The reason why the gasket material with the chromate film has high adhesiveness is because the adhesion between the chromate film and the metal plate and the adhesion between chromate film and the rubber layer are strong, and considered as follows:

The strong adhesion between the chromate film and the metal plate is achieved, because, when chromate treatment liquid is applied on the metal plate, a surface of the metal plate is etched by dichromate included in the liquid, polar components are generated on the surface, and then the polar components and the chromate film are strongly adhered via a secondary bond.

The strong adhesion between the chromate film and the rubber layer is achieved, because, polar bases of the heated-and-dried dichromate and the silica are strongly adhered to the polar bases of the rubber layer.

Such a gasket material in which a rubber layer is provided on a stainless steel plate subjected to chromate treatment, is superior in heat resistance, adhesion with antifreeze liquid, or the like. However, with the rising environmental awareness in recent years, there is a tendency to avoid chromate treatment because the chromate treatment has a problem that hexavalent chrome contained in a chromate treatment solution has a damaging effect directly on the human body. In addition, there is also a problem that effluent containing hexavalent chrome has to be subjected to special treatment according to Clean Water Law, and waste of a stainless steel material subjected to chromate treatment cannot be recycled. Further, it is also highly likely that chrome in the chromate film is extracted due to contact with antifreeze liquid or oil. Thus, the gasket material subjected to chromate treatment has serious environmental problems.

SUMMARY OF THE INVENTION

It is therefore an object of the invention to provide a gasket material which has heat resistance or adhesion equal to or more excellent than a gasket material subjected to chromate treatment, and which also has adhesion durability particularly against antifreeze liquid and has no environmental problem.

The invention was developed in consideration of such problems in the related art. As a result of diligent researches into chrome-free films in order to obtain physical properties equal to or more excellent than a product subjected to chromate treatment, it was discovered that the object could be attained by forming a film on a metal plate, the film being made from a reaction product of silica, an acid component, and metal or a metallic compound.

That is, a gasket material according to the invention includes: a metal plate; a film made from silica and a reaction product of an acid component and metal or a metallic compound; and a rubber layer formed on one or each of opposite surfaces of the metal plate through the film.

DESCRIPTION OF THE PREFERRED EMBODIMENT

The invention will be described below. In the invention, a film interposed between a metal plate and a rubber layer is made from silica and a metallic compound obtained by reaction of an acid component and metal or a metallic compound.

Phosphoric acid, orthophosphoric acid, condensed phosphoric acid, anhydrous phosphoric acid, acetic acid, formic acid, sulfuric acid, nitric acid, hydrofluoric acid, fluorocomplex, organic acid, etc., can be used as the acid component in the present invention. It is preferable that such an acid component is blended at a ratio of 5-50 wt % in solid content of a treatment solution for forming the film. It is more preferable that the ratio is 10-30 wt %. In addition, it is sufficient, if one kind of acid component is used alone. However, two or more kinds of acid components can be used by mixture. In the case if two kinds of acid components is used, additionally to using one kind of acid component selected from aforementioned acids (first acid component), it is preferable to add one kind of acid component selected from acetic acid, formic acid, hydrofluoric acid and fluorocomplex (second acid component). (e.g. If acetic acid is selected as the first acid component, it is preferable to add one kind of acid component selected from formic acid, hydrofluoric acid and fluorocomplex as the second acid component.) This is because a efficacy of a reaction between the acid components and metallic components becomes higher, and the reaction product of the acid components and a metal or a compound of a metal can be obtained more speedy. In the above all acid components, fluorocomplex is optimum for its stability to increase the reaction efficacy. For the examples of the fluorocomplex, the followings are listed: fluoro titanic acid, fluoro zirconate, fluoro silicon acid, fluoro aluminate, fluoro phosphoric acid, fluoro cobalt acid, fluoro sulfuric acid, fluoro boric acid and so on. In the case if fluorocomplex is selected as the second acid component, it is further preferable to select fluoro titanic acid or fluoro zirconate. This is because the reaction of the acid components and a metal or a compound of a metal becomes furthermore speedy.

Silica for the present invention is preferred to the type having good dispersibility in the treatment solution for forming the film. Examples of such silica include colloidal silica and vapor-phase silica. There is no particular limitation on the colloidal silica. SNOWTEX C, SNOWTEX O, SNOWTEX N, SNOWTEX S, SNOWTEX UP, SNOWTEX PS-M, SNOWTEX PS-L, SNOWTEX 20, SNOWTEX 30, SNOWTEX 40 (each made by NISSAN CHEMICAL INDUSTRIES, LTD.), etc., which are available on the market can be used as the colloidal silica. There is also no particular limitation on the vapor-phase silica. AEROSIL 50, AEROSIL 130, AEROSIL 200, AEROSIL 300, AEROSIL 380, AEROSIL TT 600, AEROSIL MOX 80, AEROSIL MOX 170 (each made by NIPPON AEROSIL CO., LTD.), etc., which are available on the market, can be used as the vapor-phase silica. It is preferable that such silica is blended at a ratio of 10-60 wt % in the formed film. It is more preferable that the ratio is 30-50 wt %.

Fe (iron), Zn (zinc), Ni (nickel), Al (aluminum), Ti (titanium), Zr (zirconium), Mg (magnesium), Mn (manganese), Ca (calcium), W (tungsten), Ce (cerium), V (vanadium), Mo (molybdenum), Li (lithium), Co (cobalt), etc., can be used as the metal for the film of the present invention. In addition, oxides, hydroxides, fluorides, etc. of these listed metals can be used as the metallic compound in the invention. In particular, Fe (iron), Zn (zinc), Al (aluminum), Ti (titanium), Zr (zirconium) and/or metal oxides thereof and/or metal hydroxides thereof and/or metal fluorides thereof are preferable, since the reaction product will be obtained more speedy. One kind of these listed metals or metallic compounds may be used singly or a plurality of kinds of these listed metals or metallic compounds may be used by mixture. It is preferable that the loading of the metal or the metallic compound is a ratio of 1-30 wt % in solid content of the treatment solution for forming the film. It is more preferable that the ratio is 5-20 wt %. Incidentally, in the case of a metallic compound, the value of the ratio is expressed by the value reduced on a basis of the metal element content.

The film may be formed on the metal plate as follows. That is, silica, an acid component and metal or a metallic compound as described above are weighed by predetermined weight respectively, and dispersed or dissolved into a suitable solvent such as water. The treatment solution obtained thus is applied to one or each of opposite surfaces of the metal plate by means of a known applicator such as a roll coater. The coating is dried at a temperature of about 150-250° C. During this heating and drying, the acid component and the metal or metallic compound react on one another so that a metallic compound is produced. This metallic compound and silica form a film. Incidentally, although there is no limitation on the quantity of the film, it is suitable that the quantity of the film is about 50-500 mg/m2 practically.

Incidentally, in the present invention, the metal plate is not limited particularly. Stainless steel (ferritic, martensitic or austenitic stainless steel), iron, aluminum, etc., may be used for the metal plate.

A rubber layer is then formed on the film. Thus, the gasket material according to the present invention is completed. Rubber for forming the rubber layer may be known one. Preferably, NBR, fluoro rubber, silicon rubber, acrylobutadiene rubber, HNBR, EPDM, etc., which are superior in heat resistance or chemical resistance, are used as the rubber. In addition, to form the rubber layer, a rubber solution or latex having a rubber material dissolved in a suitable solvent maybe applied to be 20-130 mm thick by a skim coater, a roll coater or the like, and the coating may be bonded during vulcanization at 150-250° C.

In addition, a primer layer (e.g., adhesive of nitrile rubber compound and phenolic resin) may be interposed between the rubber layer and the film in accordance with necessity.

EXAMPLES

The invention will be described below in more detail in connection with Examples and Comparative Examples. Incidentally, these examples are provided for explaining the invention, but not for limiting the invention.

Preparation of Samples

A film forming treatment solution having compositions shown in Table 1 and mixed was applied to opposite surfaces of a stainless steel plate by a roll coater, and the coating was dried at 180° C. so as to form a film. Incidentally, the quantity of the film is shown in Table 2. Next, adhesive made from nitrile rubber compound and phenolic resin was applied onto the film, and subjected to heat treatment so as to form a primer layer on the film. In addition, a sample in which such a primer layer was not formed was also prepared (Example 5). Then, a solution in which nitrile rubber was dissolved into a solvent was applied thereon (on the primer layer or film) by a roll coater, and bonded thereto (to the primer layer or film) during vulcanization at 180° C. for 10 minutes so as to form a rubber layer. In such a manner, samples were prepared.

Evaluation Method

<1. Durability against Antifreeze Liquid>

Each sample prepared thus was immersed halfway (semi-immersed) in coolant liquid (Toyota-brand Long Life Coolant) for an automobile radiator so that the sample was perpendicular to the liquid level. Then, the sample was left at a liquid temperature of 120° C. for 500 hours. Then, the sample was taken out of the coolant liquid, and a spiral scoring test was performed on the non-immersed portion and the immersed portion of the sample. In addition, a cross-cut tape peeling test was performed. Methods used for the respective tests and criteria for evaluation in the respective tests were as follows.

<1-1. Spiral Scoring Test>

A spiral with a radius of 4.5 mm was drawn 25 times on a surface of each sample by a spiral scoring tester provided according to JIS-K6894. The sample was evaluated by the following criterion.

[Criterion for Evaluation]
Score 5: The rubber layer remained fully.
Score 4: A part of the rubber layer dropped out.
Score 3: About a half of the rubber layer dropped out.
Score 2: The rubber layer remained slightly.
Score 1: The rubber layer dropped out fully.

The results are shown in the fields "non-immersed portion in semi-immersion" and "immersed portion in semi-immersion" under the field "durability against antifreeze liquid" in Table 2.

<1-2. Cross-Cut Tape Peeling Test>

The cross-cut tape peeling test was performed according to JIS-K5400 and by a procedure having the steps of:
(1) cutting the sample so that a grid ruled into 2-mm squares and having 100 intersection points is formed in a surface of the sample;
(2) sticking a pressure-sensitive adhesive tape onto the gridded surface and rubbing the pressure-sensitive adhesive tape with a rubber so that the pressure-sensitive adhesive tape adheres to the gridded surface perfectly;
(3) peeling the pressure-sensitive adhesive tape perpendicularly from the sample surface instantaneously while holding an end of the pressure-sensitive adhesive tape when a time of 1-2 minutes has passed after the adhesion of the tape; and
(4) counting the number of remaining intersection points by observing the sample surface after peeling.

The results are shown in the field "full immersion" under the field "durability against antifreeze liquid" in Table 2.

<2. Heat-Resistant Adhesion>

Each sample prepared was heated and left at 200° C. for 500 hours. After that, a cross-cut tape peeling test similar to the aforementioned one was performed.

The results are shown in the field "heat resistance" in Table 2.

TABLE 1

Compositions of Film Forming Treatment Solutions Used in Examples and Comparative Examples

| | metal | | Silica | | acid component | | |
|---|---|---|---|---|---|---|---|
| | sort*[1] | content*[1] | sort | content | Sort | content | water |
| Example 1 | aluminum | 10% | colloidal silica*[3] | 40% | phosphoric acid | 30% | 20% |
| Example 2 | nickel | 4% | colloidal silica | 40% | phosphoric acid | 20% | 10% |
| | zirconium | 16% | | | hydrofluoric acid | 10% | |
| Example 3 | tungsten | 3% | vapor-phase silica*[4] | 30% | phosphoric acid | 20% | 30% |
| | titanium | 7% | | | acetic acid | 10% | |
| Example 4 | aluminum | 3% | vapor-phase silica | 40% | phosphoric acid | 30% | 22% |
| | titanium | 5% | | | | | |
| Example 5 | titanium | 5% | vapor-phase silica | 30% | phosphoric acid | 20% | 20% |
| | zirconium | 5% | | | acetic acid | 20% | |
| Example 6 | iron | 3% | vapor-phase silica | 10% | sulfuric acid | 20% | 57% |
| | | | | | fluoro zirconate | 20% | |
| Comparative Example 1 | nickel | 6% | none | 0% | phosphoric acid | 40% | 54% |
| Comparative Example 2 | aluminum | 10% | vapor-phase silica | 20% | None | 0% | 70% |
| Comparative Example 3 | none | 0% | vapor-phase silica | 10% | None | 0% | 90% |
| Comparative Example 4 | | | chromate solution | | | | | note *[1] Each metal was blended as oxide, hydroxide or fluoride.
note *[2] Each content is expressed by wt % of compound in solid content.
note *[3] "SNOWTEX O (solid content 20 wt %)" made by NISSAN CHEMICAL INDUSTRIES, LTD. was used as colloidal silica.
note *[4] "AEROSIL 300 (silica powder)" made by NIPPON AEROSIL CO., LTD. was used as vapor-phase silica.

TABLE 2

Test Results

| | | | durability against antifreeze liquid | | | |
|---|---|---|---|---|---|---|
| | film quantity (mg/m$^2$) | full immersion | non-immersed portion in semi-immersion | immersed portion in semi-immersion | heat resistance | |
| Example 1 | 300 | 100/100 | 5 | 5 | 100/100 | |
| Example 2 | 200 | 100/100 | 5 | 5 | 100/100 | |
| Example 3 | 100 | 100/100 | 5 | 5 | 100/100 | |
| Example 4 | 400 | 100/100 | 5 | 5 | 100/100 | |
| Example 5*[1] | 500 | 100/100 | 5 | 5 | 100/100 | |
| Example 6 | 400 | 100/100 | 5 | 5 | 100/100 | |
| Comparative Example 1 | 100 | 0/100 | 2 | 1 | 10/100 | |
| Comparative Example 2 | 300 | 70/100 | 1 | 2 | 40/100 | |
| Comparative Example 3 | 400 | 50/100 | 2 | 2 | 30/100 | |
| Comparative Example 4 | Cr: 70 | 100/100 | 5 | 5 | 100/100 | | note
*[1] A rubber layer was formed without interposition of a primer layer.

As shown in Table 2, a good evaluation result equivalent to that in Comparative Example 4 in which the sample was subjected to chromate treatment was obtained in each of Examples 1 to 5 in which a film of silica and a metallic compound formed by reaction, an acid component and metal or a metallic compound satisfying the invention was provided. However, performance was conspicuously inferior in each of Comparative Examples 1 to 3 in which a film not satisfying the invention was provided.

As described above, in a gasket material according to the invention, excellent adhesion to antifreeze liquid or excellent heat resistance can be obtained without chromate treatment harmful to the human body. Thus, the gasket material according to the invention is extremely effective and practical as a solution to social problems such as environmental conservation or recyclability.

What is claimed is:

1. A gasket material to be mounted on an engine of a vehicle, comprising:
    a metal plate;
    a film made from silica and a reaction product of a fluorocomplex and a metal or a compound of a metal other than chromium or a chromium compound, the film formed directly on the metal plate, and
    a rubber layer formed on at least one of opposite surfaces of the metal plate through the film, wherein a rubber for forming the rubber layer comprises one of NBR, fluoro rubber, silicon rubber, acrylobutadiene rubber, HNBR and EPDM.

2. A gasket material according to claim 1,
wherein the fluorocomplex is blended at a ratio of 5-50 wt % in solid content of a treatment solution for forming the film.
3. A gasket material according to claim 1,
wherein the silica is blended at a ratio of 10-60 wt % in the film.
4. A gasket material according to claim 1,
wherein the metal or the compound of the metal is blended at a ratio of 1-30 wt % in solid content of the treatment solution for forming the film.
5. A gasket material to be mounted on an engine of a vehicle, comprising:
a metal plate; and
a film made from silica and a reaction product of a mixture of a first acid component and a second acid component and a metal or a compound of a metal other than chromium or a chromium compound,
wherein the first acid component is one member selected from the group consisting of phosphoric acid, orthophosphoric acid, condensed phosphoric acid, anhydrous phosphoric acid, acetic acid, formic acid, sulfuric acid, nitric acid, hydrofluoric acid, fluorocomplex and organic acid, and
the second acid component which is different from the first acid component and is a fluorocomplex.
6. A gasket material according to claim 5,
wherein a rubber layer directly formed on at least one of opposite surfaces of the metal plate through the film.
7. The gasket material according to claim 5,
wherein the fluorocomplex is fluoro titanic acid.
8. The gasket material according to claim 5,
wherein the fluorocomplex is fluoro zirconate.
9. A gasket material to be mounted on an engine of a vehicle, comprising:
a metal plate;
a film made from silica and a reaction product of a fluorocomplex and a metal or a compound of a metal selected from the group consisting of Fe (iron), Zn (zinc), Ni (nickel), Al (aluminum), Ti (titanium), Zr (zirconium), Mg (magnesium), Mn (manganese), Ca (calcium), W (tungsten), Ce (cerium), V (vanadium), Mo (molybdenum), Li (lithium) and Co (cobalt), the film formed directly on the metal plate, and
a rubber layer formed on at least one of opposite surfaces of the metal plate through the film, wherein a rubber for forming the rubber layer comprises one of NBR, fluoro rubber, silicon rubber, acrylobutadiene rubber, HNBR and EPDM.

* * * * *